United States Patent [19]

Ottenstein et al.

[11] 3,807,220

[45] Apr. 30, 1974

[54] PIPING SYSTEM AND METHOD

[75] Inventors: Sidney Allan Ottenstein; Ronald Dunegan, Houston, both of Tex.

[73] Assignees: M & J Valve Company; M & J Development Company, both of Houston, Tex.

[22] Filed: May 8, 1972

[21] Appl. No.: 251,078

[52] U.S. Cl.................... 73/40.5 R, 73/3, 340/242
[51] Int. Cl. .......................................... G01m 3/02
[58] Field of Search............ 73/40.5, 49.1, 3, 194 R, 73/194 C; 340/242; 235/151.34

[56] References Cited
UNITED STATES PATENTS

| | | | |
|---|---|---|---|
| 3,667,285 | 6/1972 | Wright et al. | 73/40.5 R |
| 3,402,605 | 9/1968 | Baker | 73/194 R |
| 3,423,988 | 1/1969 | Grove et al. | 73/3 |
| 3,505,513 | 4/1970 | Fowler et al. | 340/242 X |
| 3,530,705 | 9/1970 | Lathrop | 73/3 |

*Primary Examiner*—Richard C. Queisser
*Assistant Examiner*—Joseph W. Roskos

[57] ABSTRACT

A system and method for determining any leakage of liquid from a pipe line extending between two remote stations. It employs metering pipe loops at each of the two stations together with means for launching spheres into the pipe loops and for determining the time required for each sphere to pass through the loop between points located between the inlet and outlet end portions thereof. Preferably the system and method employs communicating means between the two remote stations whereby data required to accurately determine leakage is made available at one station.

7 Claims, 2 Drawing Figures

PIPING SYSTEM AND METHOD

CROSS-REFERENCE TO RELATED APPLICATIONS AND PATENTS

Reference is made herein to U.S. Pat. No. 3,387,483 granted June 11, 1968, U.S. Pat. No. 3,423,988 granted Jan. 28, 1969 and U.S. Pat. No. 3,530,705 granted Sept. 29, 1970 and application Ser. No. 219,432 filed Jan. 20, 1972.

BACKGROUND OF THE INVENTION

Various types of leakage detection devices have been proposed for use with liquid transmission pipe lines such as are used for conveying liquid petroleum products, (e.g., crude petroleum or refined petroleum fractions). As the pipe size and pressures are increased, the problem of leak detection becomes more serious. Any leakage should be detected promptly to make it possible to shut off the line for repairs before there has been a serious loss of liquid. The prior devices proposed for this purpose have been unsatisfactory for a number of reasons. For example, devices that have relied upon an abnormal drop of pressure in the line lack proper sensitivity and much liquid may be lost before the line can be shut down by closure of line valves. This is in part due to the fact that such devices depend upon the pressure being maintained within certain limits, whereas certain variations can occur in the line which may cause false operation or loss of sensitivity.

Another expedient which has been used to indicate leakage is to provide conventional flow meters at spaced stations, and to compare the readings of these meters to determine if there has been any loss of liquid. Conventional flow meters, whether of the positive displacement or turbine types, are known to be affected by such factors as flow rate, density, temperature and static pressure. Thus where the pipe line is of relatively large diameter (e.g., 48 inches or more), and the line pressure is relatively high (e.g., 500 to 1,000 p.s.i.), a leak in the line between two metering stations may lose a great deal of liquid from the line and go undetected. In acknowledgement of the inaccuracies to which such flow meters are subject, it has been common to periodically calibrate such meters by use of a meter prover. A meter prover commonly consists of a pipe loop which has an accurate inner diameter and which is connected at its end portions by an interchange. Means is provided as a part of the interchange to launch a sphere into the inlet end portion of the pipe loop whereby the sphere is flow-propelled through the pipe in sealing engagement with its inner surface. At the discharge end portion of the pipe loop the sphere is returned to the interchange. Sphere detectors are located at the inlet and outlet portions of the loop, and when such devices are actuated by passage of a sphere, the flow meter being checked or calibrated is started and stopped, thus giving a reading of the time required for the sphere to pass through the loop between the sphere detecting devices. With the volume of the loop between the sphere detecting devices being known, the flow meter can be calibrated for the conditions existing at the time the prover run was made. In conjunction with such an arrangement, valves are employed whereby the line flow is diverted through the metering loop during a proving run. At the completion of the run, flow through the metering loop is discontinued and is again directed through the flow meters.

U.S. Pat. No. 3,387,483 discloses one type of meter prover, the interchange in that instance being provided with power operated gate valves, and the sphere being launched by the actuation of a sphere detent to permit the sphere to enter the inlet end of the metering pipe. A similar prover is shown in U.S. Pat. No. 3,423,988. In the latter instance the valves in the interchange are associated with means for determining leakage. A more elaborate electrical control system for such meter provers is shown in U.S. Pat. No. 3,530,705 whereby a complete meter proving cycle and leak detection is carried out automatically and is initiated by operation of a single start switch. Another type of meter prover is shown in said application Ser. No. 219,432. The interchange in that instance is provided with a reciprocating plunger which can be actuated to launch a sphere into the inlet portion of the metering pipe. Two spheres are used, with one being retained within the interchange, while the launched sphere completes a cycle.

SUMMARY OF THE INVENTION

The present invention relates to piping systems and methods such as are used for conveying liquid petroleum products. More particularly, the invention relates to means and methods in connection with such systems for determining leakage of liquid from the line.

It is a general object of the invention to provide a system and method of the above character which is relatively accurate in its detection of leakage and which is not seriously affected by variations in flow rate, density, temperature and static pressure.

Another object of the invention is to provide a system and method of the above character which can be used with pipe lines of relatively large diameter and operating at relatively high static pressures.

Another object of the invention is to provide a system and method which will enable an attendant at one station along the line to determine any leakage between that station and other remote stations whereby, if leakage is indicated, the line can be promptly shut down.

The present invention involves the installation of two metering loops at remote stations along the line. These loops are connected to the line in such a fashion as to receive the normal line flow. To determine if there is any leakage occurring between the two stations, a sphere is launched into the inlet end of each metering loop whereby each sphere is flow propelled through its associated pipe from the inlet end portion to the outlet portion of the loop. The inlet and outlet portions of each loop are provided with sphere detecting devices. The time period required for movement of each sphere through its associated loop between the two sphere detectors is directly proportional to the velocity of line flow. Therefore, by comparing the time periods for the two stations, one can determine whether there has been any loss of liquid between the stations. Preferably, the system includes communication means whereby the time periods are made known at one station or a third remote station, for purposes of comparison. Also the communication means is preferably used to initiate simultaneous launching of a sphere at each of the stations, such launching being carried out at regular intervals.

Additional objects and features of the invention will appear from the following description in which the preferred embodiments have been set forth in detail in conjunction with the accompanying drawing.

DESCRIPTION OF THE PREFERRED EMBODIMENTS

Figure 1:
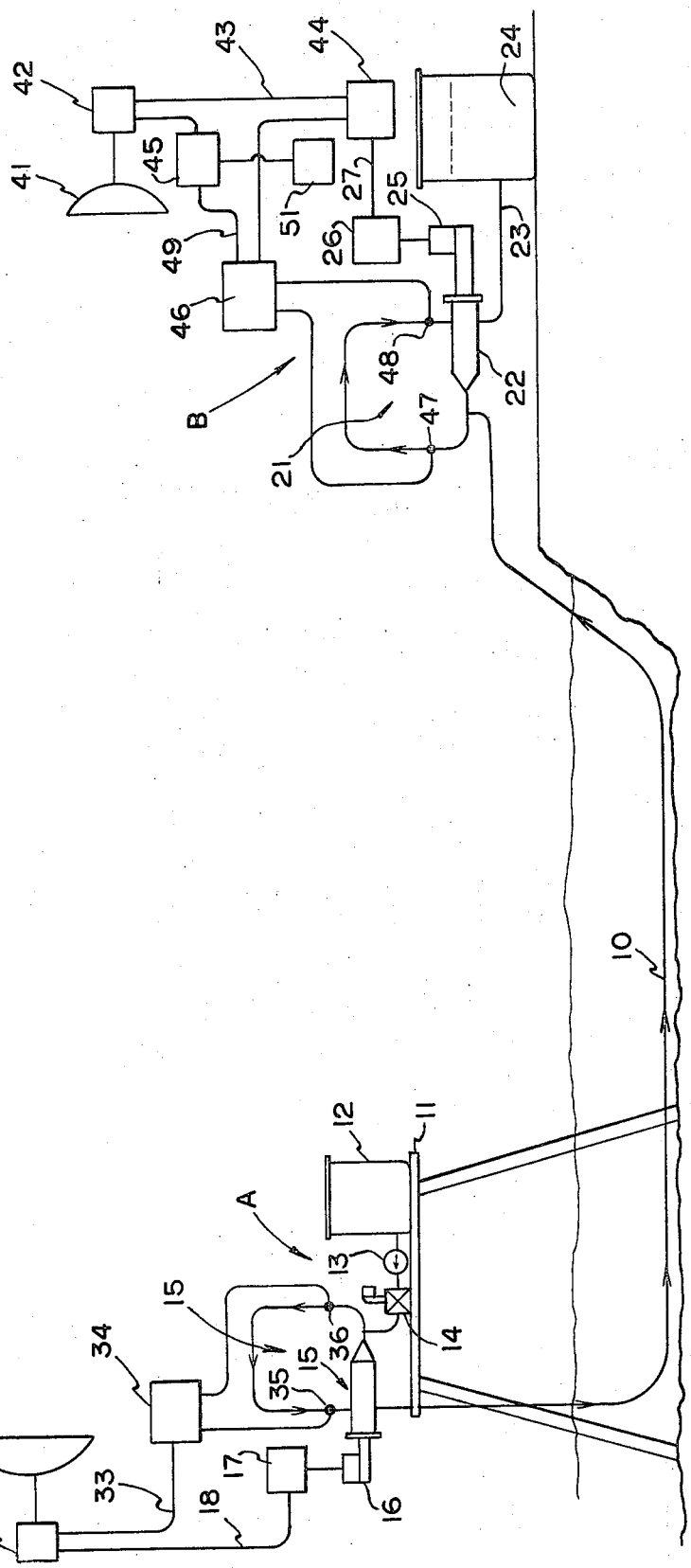
FIG. 1 is a schematic view illustrating a pipe system incorporating the present invention.

The system shown in FIG. 1 consists of stations A and B located at remote points along the pipe line 10. The pipe line in this instance is shown under water and extends from the marine platform 11 to the shore. The apparatus indicated on the marine platform 11 includes the tank 12 from which liquid is being removed by the pump 13. The pump delivers liquid through the shutdown valve 14, which may be power operated, to the inlet end of the metering loop 15. The inlet and outlet ends of the metering loop are connected by the interchange 16. The outlet end delivers liquid into the pipe 10. It is assumed in this instance that the metering loop 15 and its interchange 16 are as shown in the aforesaid copending application Ser. No. 219,432. Power operating means 16 is schematically indicated for cyclically operating the plunger of the interchange. A controller 17 is indicated for supplying energy to the operator 16, and may in turn be controlled by a command or signal over line 18 to initiate a proving run.

At the shore station there is a similar metering loop 21 with an interchange 22. The inlet end portion of loop 21 connects the discharge end of pipe 10, and the outlet end portion of the loop connects through the interchange with an outgoing line 23, which may extend to a further station, or which may deliver liquid into tank 24. The plunger of interchange 22 likewise has a power operator 25 which is energized by the controller 26. This controller responds to a command or signal applied through line 27.

As previously explained, this system preferably includes means for establishing communication between the two stations. This means may be a direct cable connection between the two stations, or may be by way of radio communication. The radio communicating means schematically illustrated for station A consists of a microwave antenna 31 connected to the receiver-transmitter 32. This receiver-transmitter is capable of applying a demand signal over line 18 to the controller 13, and is responsive to a signal applied over line 33 from device 34. Device 34 is a time measuring device connected to the sphere detectors 35 and 36 of the metering loop 15. It accurately measures the time for a sphere to pass through the loop between the two sphere detectors, and it applies a signal to line 33 which may be coded or characterized to transmit the amount of measured time to Station B.

At station B there is likewise a microwave antenna 41 connected to the transmitter-receiver 42. It is responsive to a signal applied over line 43 from controller 44 to transmit a start signal to station A. At the same time, controller 44 applies a command signal over line 27 to cause energy to be supplied to power operator 25 to carry out a cycle of operation. The receiving portion of the transmitter-receiver 42 is receptive to coded or characterized signals transmitted by the time measuring device 34, and such received signals are applied to the computer device 45. Another timing device 46, like device 34 of station A, is connected to the sphere detecting devices 47 and 48 of the loop 21, and also supplies its time characterized signal through line 49 to the computer device 45. The computer device 45 determines any difference between the times measured by the devices 34 and 46, and this difference is indicated by device 51 which may be in the form of a suitable read-out, indicating or alarm device. With respect to time measurement signals, they may be in the form of pulse trains of constant frequency that are generated or gated by devices 34 and 46, whereby the number of such pulses as counted by computer 45 is the function of the time lapse for a run.

The system and method of FIG. 1 operate as follows. Normally the pump 13 is in operation, and flow continuously occurs through the loop 15, line 10, loop 21, and outgoing line 23. A liquid petroleum product may be continuously supplied to the tank 12, or instead of this tank, the pump may be directly connected with one or more producing wells. If the producing wells provide sufficient static pressure, the pump 13 may be omitted. To determine if any leakage is occurring from the line 10, between stations A and B, the operator at station B causes device 44 to initiate supply of energy to the operator 25 to launch a sphere into the metering loop 21. Simultaneously a signal is transmitted from antenna 41 and received by antenna 31 at station A, with the result that a signal is applied through line 18 to controller 17 to cause the operator 16 to be energized, thereby simultaneously launching a sphere into the inlet end of loop 15. Assuming that the two loops are of the same internal diameter and the same effective lengths between the sphere detectors, the time required for the spheres to complete a metering run will normally be identical, since the flow velocity through the loops is the same. The time of each run is measured by the devices 34 and 46, and device 34 causes a signal to be applied to the radio transmitter-receiver 32 through line 33, whereby signal is recieved at station B and supplied to the computing device 45. Computing device 45 also receives a signal from device 46 characterized by the time measured, and any difference between the two times is displayed at 51. If a time difference is displayed at 51, then the operator at station B may immediately initiate shut-down of the line. This may involve closing the valve 14 at station A with simultaneous closing of a line valve at or near station B. It may also involve closing additional valves located along the length of the line 10.

The system and method described above may also include suitable provision for monitoring density, temperature and static pressure at both stations A and B. For this purpose suitable density, temperature and pressure indicating devices can be located at each station, and additional channels of the communication system may be used whereby such information is provided at station B and can be monitored either continuously or at various intervals.

Although leak detection operation can be carried out at irregular intervals, it is generally desirable that such operations be carried out according to a regular schedule, as for example, at the end of every hour.

The system and method described above are capable of accurately determining leakage in the line between the two stations. Because the metering loops 15 and 21 operate as a function of flow velocity, the time required to complete a run is not dependent upon variations in pressure. If there is a temperature difference between stations A and B then the operator at station B can make a slight correction for such differences. Also the computer 45 may be set to automatically compensate for such changes. In normal operation on one type of liquid petroleum product, no substantial density differences will exist between stations A and B. However, when the line is being used to convey petroleum products of different gravities, it is desirable to provide density measuring whereby compensating factors can be taken into account in the event there is a substantial difference in densities between the two stations.

The two loops 15 and 21 are preferably identical whereby when the flow velocity is the same through both loops and there is no loss of liquid between the two stations, the time required for the spheres to be flow propelled between the sphere detecting devices will be the same. However, such identity is not essential, and if for example one loop is longer than the other, this difference in volumetric capacity can be taken into account in determining whether there is any leakage, or compensating factors can be supplied to the computer 45 for the same purpose. Generally it is desirable for the meter prover loops to have the same internal diameter, and that this internal diameter be about the same as that of the pipe 10. However, it is theoretically possible for the pipe loops to differ in diameter from the main line, as for example somewhat smaller than the main line diameter. Where the invention is being used between stations of an extended pipe line, it is desirable to have the loops of the same internal diameter as that of the pipe whereby the flow velocity remains the same at all points in the line and through the metering loop, whereby there is no unnecessary loss of energy due to changing velocities.

Figure 2:
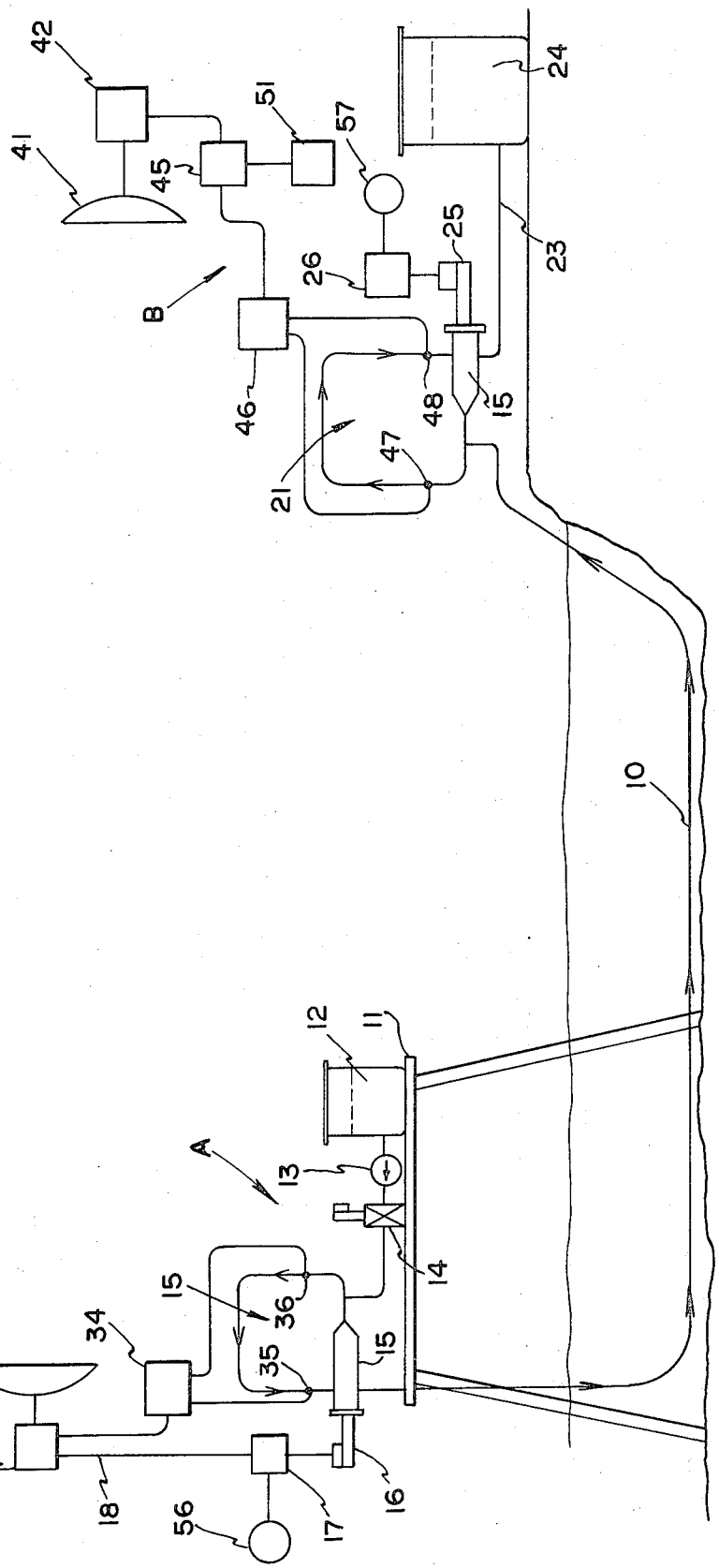
FIG. 2 is a schematic diagram like FIG. 1, but somewhat simplified.

FIG. 2 illustrates a simplified embodiment of the invention. In this instance, motor operated programming timers 56 and 57 are provided at each station and operate continuously in synchronism. The timer 56 is adjusted to supply a start signal to the controller 17 at regular intervals whereby the controller energizes the operator 16 of the interchange 15 for launching a sphere. At the same time the timer 57 signals controller 26 to actuate the operator 25 of the interchange 22. The devices 56 and 57 may for example be cyclic switches driven by synchronous electrical motors that are serviced by a common source of alternating current.

For the purpose of indicating at one station the time required for the spheres to pass through the metering loops between the sphere detecting devices, we have indicated a simple radio communication system. Thus controller 17 is indicated as supplying a signal through line 18 to the transmitter-receiver 52, and likewise the time measuring device 34 is indicated as applying signal pulses to 52. At station B the receiver 42 receives signal pulses in accordance with the time measured by 34 at station A, and also receives signal pulses from measuring device 46. The computing device 45 is again shown connected with the indicating or read-out device 51. This device may again be connected to a communicative system which transmits the information desired to a remote monitoring station.

It will be evident that the system and method of FIG. 2 can be set to obtain repeated indications of a leak in the line 10 at regularly spaced intervals, such as one hour apart. Furthermore, the system can function automatically without the need of an operator at either station, with the significant results of each check being transmitted to a remote monitoring station. Here again if a leakage should develop, that portion of the line can be shut down by closing the valves on the upstream and downstream sides of the same.

We claim:

1. In a method for determining leakage of liquid from a pipe line extending between two remote stations (hereinafter termed stations A and B) while liquid is being continuously delivered into the line under pressure at station A and is being continuously delivered under pressure at station B, each station having a metering pipe loop of predetermined volume, the steps of causing the line liquid to flow through both loops, launching a sphere into the inlet end of each metering pipe and in sealing contact with the inner surface thereof whereby each sphere is flow propelled from the inlet end of the metering pipe with which it is associated to the outlet end thereof, measuring the time required for each sphere to travel between points located at the inlet and outlet ends of its associated metering pipe, and then comparing the measured times to determine any reduction in flow velocity at station B due to leakage of liquid from the pipe line between stations A and B.

2. A method as in claim 1 in which spheres at stations A and B are launched simultaneously into the respective metering loops.

3. A method as in claim 1 in which the two spheres are launched at successive timed intervals.

4. In a piping system having means for determining pipe leakage, a pipe extending between two remote stations A and B, the pipe being adapted to receive liquid under pressure at station A and to deliver liquid under pressure at station B, a metering pipe loop of predetermined volume at station A, a second metering pipe loop of predetermined volume at station B, connections between the inlet and outlet ends of both loops to the line whereby line flow normally occurs through both of the loops, interchange means connecting the inlet and outlet end portions of each metering loop, means associated with each interchange adapted to be actuated for launching a sphere from the interchange means into the inlet end of the associated pipe loop whereby the sphere is flow-propelled through the metering pipe while in sealing contact with the inner surface thereof, each interchange also serving to receive the sphere after being flow-propelled through the associated loop to the outlet end portion thereof, sphere detecting means at the inlet and outlet portions of each metering loop, and means for measuring the time for each of the spheres to pass through its associated loop between said sphere detecting devices, and means for comparing such measuring times to obtain an indication of leakage between the stations.

5. A system as in claim 4 having means for simultaneously launching the spheres at both stations.

6. A system as in claim 4 together with communication means between the stations serving to effect simultaneous launching of spheres at both stations A and B.

7. A system as in claim 4 together with communication means between stations A and B whereby the measured times for movement of the spheres through the pipe loops is communicated to one station for determining pipe leakage.

\* \* \* \* \*